United States Patent
Limbacher

(10) Patent No.: US 11,136,033 B2
(45) Date of Patent: Oct. 5, 2021

(54) METHOD FOR OPERATING A DRIVER ASSISTANCE SYSTEM IN A MOTOR VEHICLE, THE SYSTEM SUPPORTING THE DRIVER IN COASTING MODE, AND MOTOR VEHICLE

(71) Applicant: AUDI AG, Ingolstadt (DE)

(72) Inventor: Reimund Limbacher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 327 days.

(21) Appl. No.: 16/315,498

(22) PCT Filed: Jun. 20, 2017

(86) PCT No.: PCT/EP2017/064993
§ 371 (c)(1),
(2) Date: Feb. 5, 2019

(87) PCT Pub. No.: WO2018/007140
PCT Pub. Date: Jan. 11, 2018

(65) Prior Publication Data
US 2019/0210604 A1    Jul. 11, 2019

(30) Foreign Application Priority Data
Jul. 8, 2016 (DE) .......................... 102016008363.8

(51) Int. Cl.
*B60W 30/18* (2012.01)
*B60W 50/00* (2006.01)
(Continued)

(52) U.S. Cl.
CPC .... *B60W 30/18072* (2013.01); *B60W 30/143* (2013.01); *B60W 30/18127* (2013.01);
(Continued)

(58) Field of Classification Search
CPC ......... B60W 30/18072; B60W 30/143; B60W 30/18127; B60W 30/18154;
(Continued)

(56) References Cited

U.S. PATENT DOCUMENTS

| | | | |
|---|---|---|---|
| 5,662,548 A | * | 9/1997 | Mori ................... F16H 61/0213 477/114 |
| 8,423,259 B2 | | 4/2013 | Labuhn et al. |

(Continued)

FOREIGN PATENT DOCUMENTS

| | | |
|---|---|---|
| CN | 102328657 A | 1/2012 |
| CN | 103608230 A | 2/2014 |

(Continued)

OTHER PUBLICATIONS

International Search Report and Written Opinion of the International Searching Authority directed to related International Patent Application No. PCT/EP2017/064993, dated Jan. 10, 2018, with attached English-language translation; 33 pages.

(Continued)

*Primary Examiner* — Angelina Shudy
(74) *Attorney, Agent, or Firm* — Sterne, Kessler, Goldstein & Fox P.L.L.C.

(57) ABSTRACT

Method for operating a driver assistance system in a motor vehicle wherein an action plan comprising at least one measure for the targeted deceleration of the motor vehicle is determined, as well as predictive route data describing the distance to the coasting destination is determined when the driver ends the activation of the gas pedal and at least one potential coasting destination, which requires deceleration of the motor vehicle, is determined, and said measure is used for the longitudinal guidance of the motor vehicle, whereby the measures are selected from the measure group of at least one operation in a free-run operating mode and one opera- (Continued)

tion in a coasting operating mode, whereby a stopping position is determined as the coasting destination and the action plan is determined for the deceleration of the motor vehicle to a complete stop at the stopping position.

14 Claims, 3 Drawing Sheets

(51) Int. Cl.
  *B60W 50/14* (2020.01)
  *B60W 30/14* (2006.01)
(52) U.S. Cl.
  CPC .. *B60W 30/18154* (2013.01); *B60W 50/0097* (2013.01); *B60W 50/14* (2013.01); *B60W 2030/1809* (2013.01); *B60W 2510/24* (2013.01); *B60W 2520/10* (2013.01); *B60W 2540/10* (2013.01); *B60W 2552/20* (2020.02); *B60W 2555/20* (2020.02); *B60W 2555/60* (2020.02); *B60W 2556/50* (2020.02); *Y02T 10/60* (2013.01)
(58) Field of Classification Search
  CPC ........... B60W 2030/18081; B60W 2030/1809; B60W 50/0097; B60W 50/082; B60W 50/14; B60W 2050/143; B60W 2556/50; B60W 2552/20; B60W 2555/60; B60W 2510/24; B60W 2520/10; B60W 2540/10; B60W 60/001; B60W 2555/20; B60W 60/00; Y02T 10/60; G05D 1/0088; F16H 61/20
  See application file for complete search history.

(56) References Cited

U.S. PATENT DOCUMENTS

| | | | |
|---|---|---|---|
| 9,229,457 B2 | 1/2016 | Huelsebusch et al. | |
| 9,896,104 B1* | 2/2018 | Kim | B60W 50/14 |
| 10,017,172 B2* | 7/2018 | Payne | B60L 15/2009 |
| 10,190,511 B2 | 1/2019 | Abdul-Rasool et al. | |
| 10,239,526 B2* | 3/2019 | Durgin | B60W 30/16 |
| 2002/0152015 A1* | 10/2002 | Seto | B60K 31/0008 |
| | | | 701/96 |
| 2010/0286884 A1* | 11/2010 | Bunn | B60W 40/105 |
| | | | 701/70 |
| 2011/0098151 A1* | 4/2011 | Ziemer | B60K 6/485 |
| | | | 477/20 |
| 2011/0307122 A1 | 12/2011 | Kanning et al. | |
| 2012/0010047 A1 | 1/2012 | Strengert et al. | |
| 2013/0297124 A1* | 11/2013 | Be | G06F 17/00 |
| | | | 701/22 |
| 2014/0345564 A1* | 11/2014 | Matsunaga | F02D 17/04 |
| | | | 123/339.1 |
| 2015/0032343 A1* | 1/2015 | Lochocki, Jr. | B60W 30/18063 |
| | | | 701/54 |
| 2015/0151761 A1* | 6/2015 | Suzuki | B60W 10/02 |
| | | | 701/67 |
| 2015/0158491 A1* | 6/2015 | Suzuki | B60W 30/18072 |
| | | | 701/67 |
| 2015/0224976 A1* | 8/2015 | Wang | B60W 10/08 |
| | | | 701/22 |
| 2018/0029599 A1* | 2/2018 | Kim | B60W 50/14 |
| 2018/0118189 A1* | 5/2018 | Payne | G01C 21/20 |
| 2019/0031172 A1* | 1/2019 | Kodera | B60W 20/16 |
| 2019/0193713 A1* | 6/2019 | Son | B60W 20/00 |
| 2019/0210604 A1* | 7/2019 | Limbacher | B60W 30/18127 |
| 2020/0023850 A1* | 1/2020 | Burford | B60W 10/18 |
| 2020/0231180 A1* | 7/2020 | Takahashi | B60W 60/0025 |
| 2020/0355265 A1* | 11/2020 | Elflein | B60L 15/20 |

FOREIGN PATENT DOCUMENTS

| | | | | |
|---|---|---|---|---|
| DE | 102010018267 A1 | | 12/2010 | |
| DE | 102010023198 A1 | | 12/2011 | |
| DE | 102011083013 A1 | | 3/2013 | |
| DE | 102011084606 A1 | | 4/2013 | |
| DE | 102013104533 A1 | | 11/2013 | |
| DE | 102012212035 A1 | | 1/2014 | |
| DE | 10214002111 A1 | | 8/2015 | |
| DE | 102014002111 A1 | * | 8/2015 | .......... B60W 30/143 |
| EP | 2738412 A1 | | 6/2014 | |
| JP | 2012-116428 A | | 6/2012 | |

OTHER PUBLICATIONS

International Preliminary Report on Patentability directed to related International Patent Application No. PCT/EP2017/064993, dated Jan. 17, 2019, with attached English-language translation; 22 pages.

* cited by examiner

METHOD FOR OPERATING A DRIVER ASSISTANCE SYSTEM IN A MOTOR VEHICLE, THE SYSTEM SUPPORTING THE DRIVER IN COASTING MODE, AND MOTOR VEHICLE

TECHNICAL FIELD

The present disclosure relates to a method for operating a driver assistance system which provides assistance to a driver during a coasting process in a motor vehicle whose drive train can be operated in a free-run operating mode, in which a drive motor is disconnected from the rest of the drive train by a clutch, wherein, when the driver assistance system is activated, an action plan comprising at least one measure for the targeted deceleration of the motor vehicle is determined, taking into account at least one effectiveness criterion relating to the energy balance of the motor vehicle, and at least one destination criterion relating to the deceleration with respect to the coasting destination as well as predictive route data describing the distance to the coasting destination is determined when the driver ends the activation of the gas pedal and at least one potential coasting destination, which requires deceleration of the motor vehicle, and said measure is used for the longitudinal guidance of the motor vehicle, whereby the measures are selected from the measure group of at least one operation in a free-run operating mode and one operation in a coasting operating mode. The present disclosure relates to a motor vehicle as well.

BACKGROUND

Driver assistance systems are known that are capable of forming the coasting speed while a motor vehicle coasts by means of an operating strategy using an appropriate selection or sequence of potential coasting modes. The coasting process is characterized by the driver having stopped actuating the gas pedal, i.e., not using it any longer, but not having used the brake pedal either. The target speed at the end of the coasting process is lower than the current vehicle speed. What are known as possible operating modes during the coasting process are in particular a free-run operating mode and a coasting operating mode. To achieve a stronger deceleration, a recuperation operating mode may also be used in a motor vehicle with an electric motor; alternatively or additionally, measures are conceivable in an action plan during the coasting process that switch down to a lower gear or ultimately an automatic actuation of the operating brake of a brake system.

A method of the type described above is known for example from DE 10 2014 002 111 A1, which is hereby incorporated in the disclosure of the present disclosure by reference. In many cases, the coasting destination comprises a position at which the motor vehicle has a lower desired speed than the actual speed. These kinds of coasting destinations, which are derived from the digital map data of a navigation system and/or sensor data, for example traffic sign recognition, may comprise, for example, the start of a stretch of road with a reduced permitted speed, for example a respective traffic sign or the start of city limits, a curve where slower speeds are required, a roundabout, an intersection, a steep descent, and the like. Each time such a coasting destination exists or can be determined, the driver assistance system responds immediately following a termination of the gas pedal actuation by the driver. Consequently, that method initially functions independently from any indication function that may be provided, but assists the driver in a modified manner, i.e., even when the driver removes the foot from the gas without a prior indication, i.e., ends the actuation of the gas pedal to achieve a better energy efficiency and an improved achievement of the desired speed at the coasting destination, i.e., the determined position. The proposed driver assistance system therefore can assist the driver even when the driver has not requested any indications.

This is realized in DE 10 2014 002 111 A1 by selecting a specific operating strategy of the motor vehicle that is reflected by the action plan comprising the measures for decelerating the motor vehicle. In other words, that method determines a predictive coasting operating strategy for motor vehicles capable of a free-run, which does not, as customary in the other conventional techniques, simply set either the free-run operating mode or the coasting operating mode until the coasting destination has been reached, but which comprises methods for switching between a number of operating states relative to the longitudinal guidance of the motor vehicle, and which can, for example, switch between a free-run operating mode and a coasting mode, so that it is possible to achieve the best efficiency and the most precise attainment of the desired speed. The efficiency criterion, which relates to the energy efficiency of the motor vehicle, and the target criterion, which refers in particular to the desired speed at the position described by the coasting destination, therefore constitute the optimization targets in an optimization method for the determination of the measures, whereby the optimization targets may, for example, be considered in a coasting function in a weighted manner. The optimization method for the determination of the measures of the action plan therefore uses the predictive route data to realize the best possible energy efficiency and a deceleration that is as close to the desired speed as possible.

It should be noted that the route data represents a statistical description of the road ahead that leads to the coasting destination, which means that it may, in particular, contain its course, inclines, declines, road surface, and the like. A dynamic description of the road ahead that leads to the coasting destination may be considered in the context of the method described in DE 10 2014 002 111 A1 as well. As already mentioned, predictive route data is generally derived from the digital map data of a navigation system of the motor vehicle, but may also comprise information derived from sensor data provided by environment sensors of the motor vehicle. The predictive route data may also be used to determine the coasting destination.

In addition to the predictive route data, ego data that describes the current operation of the motor vehicle is obviously considered as well, for example its current speed, which was already mentioned, as well as the characteristics of the motor vehicle which may, for example, be mapped in a dynamic model of the motor vehicle that is used to determine the action plan. The dynamic model of the motor vehicle offers, in this case, the possibility to determine for certain characteristics of the road ahead how strong the brake deceleration is in different operating states of the motor vehicle, for example in the free-run operating mode of the drive train and in different switching stages of the transmission in the coasting mode of the drive train. When reference is made to a braking deceleration in the context of this description, this refers to any and all effects that slow down the motor vehicle, i.e., not only braking interventions but, for example, also deceleration effects triggered by the recuperation and the like.

The method of DE 10 2014 002 111 A1 therefore focuses on the actual point in time the actuation of the gas pedal is ended and selects the coasting strategy described by the action plan that is best for this point in time. To this purpose, and in addition to the setting of the operating states already mentioned, other measures may be provided in the measure group that influence the deceleration of the motor vehicle.

What is problematic about the design according to DE 10 2014 002 111 A1 is that the coasting assistant described can only work up to low speeds of approximately 20 km/h, because below these speeds, the free-run operating mode or the coasting operation must be terminated and a crawl control, in particular in the case of an automatic transmission, is to ensure a positive drive torque again. In addition, it does not describe a reliable determination of coasting destinations where the motor vehicle is supposed to stop.

The present disclosure therefore is based on the task of providing an expanded application spectrum for the assistance of a driver during a coasting process.

To solve this task, the present disclosure provides in connection with a method of the type described above that the stopping position is determined as the coasting destination and that the action plan for the deceleration of the motor vehicle to a stop at the stopping position is determined.

The present disclosure therefore proposes to expand the functionality of conventional coasting driver assistance systems so that even a deceleration of the motor vehicle to a stop is possible, if the traffic situation makes that seem practicable. To this purpose, techniques are used to expand the determination of coasting destinations to where stopping positions can be determined as well, whereupon suitable measures in the action plan are taken to, in fact, decelerate the motor vehicle, so much so that it comes to a stop at the stopping position. This results in the special advantage of a comfort-enhanced coasting assistant since even a stopping process is provided by the function to assist the driver. It is particularly advantageous in this context that the driver is not forced to activate other driver assistance systems that rely on radar sensors such as ACC (adaptive cruise control) systems so that these other driver assistance systems take over the braking process until the vehicle has come to a stop. The expanded coasting function described here can be realized in particular without any radar sensors.

A further development of the present disclosure provides, however, that additional information received from a traffic light and/or a barrier by means of a vehicle-to-infrastructure communication is used to determine the stopping position. Conventional techniques provide various infrastructure systems that are relevant for the operation of the motor vehicle, in particular traffic lights and/or barriers, with a communication option by means of which the motor vehicles in their environment can be provided with information about the operating state of the respective infrastructure device, so that it becomes known in particular in connection with traffic lights and barriers whether these currently permit travel to be continued and/or, in particular when the motor vehicle reaches them, the vehicle has to stop soon, i.e., define a corresponding stopping position. Such state information constitutes a particular possibility for obtaining reliable information about stopping positions. It is possible to use traditional vehicle-to-infrastructure communication standards (c2x communication) for this purpose, as they are used at the same time for vehicle-to-vehicle communication (c2c).

It is furthermore practicable to use digital map information from a navigation system, in particular the position of stop signs and/or intersections along the currently traveled route for the determination of the stopping position. Often, the precise positions of intersections, stop signs, and/or traffic-influencing objects that define other stopping points are known from the digital map data of navigation systems. This information may be used as well.

It is furthermore preferred that traffic sign information determined by processing data from an optical imaging device, in particular a camera, and/or information describing a directly leading vehicle obtained from the sensor data of at least one environment sensor and/or information about a directly leading vehicle determined with communication data from a vehicle-to-vehicle communication is used to determine the stopping position. Traffic sign recognition systems may be used, for example, to determine the presence of stop signs and the like, which define a stopping position accordingly; stop lines at stop signs and the like are easy to determine as well by image-processing data from an optical imaging device. In addition, information about directly leading vehicles is useful as well because it reports that a directly leading vehicle has stopped, which means that the own motor vehicle must stop as well as that the position where the vehicle/traffic participant has come to a standstill provides a corresponding stopping position.

Here, the corresponding information may be determined from the vehicle-to-vehicle communication (c2c communication), whereby the same communication device can be used in the same manner as the vehicle-to-infrastructure communication already mentioned. Information about a directly leading vehicle may be obtained for example from sensor data of radar sensors and/or from other vehicle systems of the motor vehicle as well, for example from an ACC system.

In a further development of the present disclosure, it may be provided that an activation of a crawl control of the drive train is suppressed during the execution of the action plan because the current speed of the motor vehicle falls short of a threshold value. If, therefore, it is provided for normal operating states of the motor vehicle that a crawl control of the drive train is activated when the current speed of the motor vehicle falls short of a threshold value, especially when the vehicle has an automatic transmission, this can be actively suppressed as part of the assistance function provided for the coasting process, so that a mandatory deactivation of the free-run operating mode and the coasting mode does not take place and that the measures of the action plan do not have to work against the crawl control. A threshold value for the current speed at which the crawl control is generally activated may be around 20 km/h for example.

It may be advantageous that after the vehicle has come to a complete stop at the stopping position, the motor vehicle is actively held in place by a holding action, which may be part of the action plan, at least for a predetermined period of time. This way, the vehicle is prevented from starting to roll again after it has come to a complete stop at the stopping position. It is advisable to limit this period of time to a time span so as not to impair the driver in his own control of the motor vehicle. Specifically, a braking system of the motor vehicle may be activated here for the performance of the holding action, in particular by performing a hydraulic or electromotive holding of an operating brake of the braking system. Since the time span covers a rather short period of time, it is preferred here that a hydraulic brake actuation is performed that cannot be permanently used when at a complete stop, but which is completely sufficient to bridge the short time span. What is conceivable as well are more permanent solutions for keeping the motor vehicle at a complete stop in the stopping position, for example an electromotive holding of the operating brake, which is, however, less preferred because this is much more complex and because it is assumed in the context of the application of the coasting support that the driver takes over the brakes again when at a complete stop, so that even a "weak" holding of the motor vehicle at a complete stop may be sufficient. For the intended short time spans, the generally conceivable use of a parking brake is less useful.

Especially in this context, it is particularly preferred when, as a complete stop at the stopping position is reached, additionally in particular an optical takeover indication about the manual holding of the complete stop is provided to the driver. To this purpose, a corresponding output device may be used, for example a display arranged in an instrument panel or the like. The driver is therefore asked in an appropriate manner to continue to keep the motor vehicle at a complete stop by actuating the brake pedal, i.e., to actively take over the vehicle guidance again. After the motor vehicle has come to a complete stop at the stopping position, it is still kept at a stop for the time span. In addition, the takeover indication is issued to the driver, which may say, for example, "Please activate the brake pedal." If the driver takes over the brake pedal during the time span, it may preferably be provided that the takeover indication is deactivated again, in particular turned off in a display or the like.

In this context, an embodiment of the present disclosure provides that, if the driver does not take control during the time span, a stronger warning, in particular, which is more likely to be perceived than the takeover indication, is issued to the driver at the end of the time span. This means that a two-tiered reference function is provided, whereby the warning is designed in a much more perceivable manner than the takeover indication, and therefore has a warning effect, after the time span, which will be addressed in further detail below. It may also be provided that the motor vehicle slowly starts to move again, for example due to the crawl control which is to be activated again. If the takeover indication is of an optical nature, the acoustic warning to be provided may be for example a warning sound so that the driver learns from the two-tiered indication concept in an easy manner that he must take control of the motor vehicle when it is at a complete stop, because otherwise the warning is issued.

As already mentioned, it is practicable when, after the end of the time span, the crawl control whose activation is initially suppressed in the embodiment already discussed is activated, at least if the driver did not manually maintain the complete stop. After the time span, the crawl control ultimately starts to slowly move the motor vehicle again, which has an additional warning effect, if the driver did not manually take over the holding of the motor vehicle at a complete stop. In particular in connection with the acoustic warning, an assistance function is creative, which intuitively teaches the driver to take over the braking at a complete stop after an assisted coasting process.

The predetermined time span may preferably be 1 to 3 seconds, in particular 2 seconds. This is advantageous because, then, after the motor vehicle has been kept at a complete stop for a short period of time, the driver is hardly impaired and can continue to drive without any problems once the traffic situation allows this from the driver's point of view. Furthermore, the driver may easily and quickly react as soon as he has been intuitively taught how to use the coasting function as described. This length of the time span is advantageous even when the holding action comprises a hydraulic holding of the operating brake of the braking system because such a holding action can be realized in an unproblematic and reliable manner for such a period of time.

A practical, general further development of the present disclosure provides that the maximum deceleration allowed during the action plan is limited, in particular to a threshold value ranging from 1 to 3 m/s$^2$, for example 2 m/s$^2$. It is advantageous, if the maximum allowed deceleration of the driver assistance system is limited, to prevent a driver from relying too much on the driver assistance system. In particular in situations in which a directly leading motor vehicle brakes very hard, the driver assistance system is intentionally not activated so that the main control over the vehicle remains with the driver, who is to remain "in the loop." If an excessive deceleration of the motor vehicle in the assistance with the coasting process were to become necessary, a control takeover request can be made by this embodiment by means of an optical and/or acoustic emission which must inform the driver that he must intervene by braking himself. This increases the safety even in these situations. The change to the brake retardation may be limited for a particular measure as well to increase comfort.

Embodiments of the present disclosure may, in particular, be further developed by using an adaptation of a recuperation step and/or a change in a switching step of a transmission of the motor vehicle and/or a measure group comprising a brake interference in the braking system of the motor vehicle. It should be pointed out here that an actual brake interference, which is the measure least acceptable to the driver and which might be rated very badly in an optimization process, should be avoided as much as possible. To reduce the speed of the motor vehicle, therefore, certain deceleration-increasing or deceleration-decreasing measures that are defined by a measure group may be used in the action plan. One of these measures, which is always possible, is the automatic switch between the free-run operating mode and the coasting mode of the drive train by closing or opening the clutch. If the design of the clutch allows this, a smooth clutch for the creation of intermediate states is quite conceivable in the context of the present disclosure as well. Other measures to influence the braking deceleration of the motor vehicle comprise, for example, a switching between different switching steps of the transmission of the motor vehicle, which increases or decreases the drag torque (motor brake). In motor vehicles with an electrified drive, for example a belt-driven starter generator and/or an electrical drive motor, an increase and/or decrease of the generative deceleration torque may lead to a suitable adaptation of the brake deceleration and therefore a change of the recuperation setting. A final conceivable measure is also to actuate an automatically controllable braking system for the performance of the braking process. This final possible measure is less preferred, however, because a general goal of the deceleration control and the determination of the action plan is that the deceleration interferences are perceived as only slightly corrective so that, first of all, the driver does not feel dominated/impaired, but also that no expectation is created that the driver assistance system will always brake in a manner that is strong and reliable enough to actually achieve the intended speed, which is not always advisable, especially when the coasting process is initiated late by the driver ending the actuating of the gas pedal. The permission to use brake interventions for a braking system may also be coupled with an indication function so that, for example, a control of the motor vehicle's braking system may only be permitted as a measure if the driver follows an indication to end the actuation of the gas pedal in a timely manner and within a predetermined time after the issuance of the indication. As already mentioned, a driver takeover request is conceivable anytime the deceleration options available are not enough to achieve a complete stop of the motor vehicle at the stopping position.

It is also possible to provide that the at least one measure allocated to a measure execution moment in the action plan pertains to a switch of the operating state of the motor vehicle relating to the longitudinal guidance. For explanation purposes, it should be pointed out that the two operating modes referenced, i.e., the free-run operating mode and the coasting operating mode, relate to the drive train of the motor vehicle, while the operating mode of the motor vehicle itself is generally defined with regard to the longitudinal guidance. It therefore also comprises the actuation of systems outside of the drive train such as a braking system and the like. Furthermore, a distinction must be made in connection with the operating state of the motor vehicle in connection with the longitudinal guidance between different switching states in the coasting operating mode.

The thus defined action plan therefore contains a sequence of measures that are taken at specific measure execution points so as to facilitate a coasting process that is as energy efficient as possible and to achieve a complete stop at the stopping position that is as precise as possible.

It should also be noted here that the explanations regarding a combination with a function for the emittance of an indication for the termination of an actuation of the gas pedal to the driver according to DE 10 2014 002 111 A1 and regarding other driver interactions may be applied as well.

An embodiment of the present disclosure provides that the action plan is determined in consideration of the traffic situation data describing the current traffic situation. In this case therefore, not just route data describing static characteristics of the path to the coasting destination are used, but the current traffic situation, and therefore the dynamic description of the path to the coasting destination, is taken into consideration as well, which may obviously affect the traffic participant behind the motor vehicle as well. This way, therefore, temporary influences may duly be responded to as well, which further increases the flexibility of the method according to the present disclosure and driver acceptance as well as safety and comfort. Here, traffic situation data describing other traffic participants, in particular those directly behind or in front of the motor vehicle, and/or the current weather conditions and/or the current road condition may be used and/or the traffic situation from current sensor data from environment sensors of the motor vehicle and/or communication data received from vehicle-to-X communication, in particular vehicle-to-vehicle communication, may be determined. This type of dynamic traffic situation data and its termination is generally known. As already shown, the traffic situation data that describes the current traffic situation, in particular the initially mentioned data, may clearly be analyzed for the determination of the coasting destination, here the stopping position, as well.

When the currently determined action plan is carried out in deviation from the previous action plan and/or when a current action plan cannot be determined on the basis of the current traffic situation, it is advisable to communicate this to the driver and, in particular, to ask the driver to take control. As already shown, continuous monitoring to determine whether the action plan leads to the desired complete stop is very advisable for many reasons, in particular to increase the safety in the motor vehicle.

In addition to the method, the present disclosure also relates to a motor vehicle, comprising a drive train operable in a free-run operating mode and a driver assistance system assisting the driver during a coasting process with a controller formed to carry out the method according to the present disclosure. All remarks relating to the method according to the present disclosure may be applied to the motor vehicle according to the present disclosure with which therefore the advantages already stated can be obtained.

BRIEF DESCRIPTION OF THE DRAWINGS

Other advantages, features and details of the present disclosure result from the claims, the description of embodiments below, and the drawings, in which:

DETAILED DESCRIPTION

Figure 1:
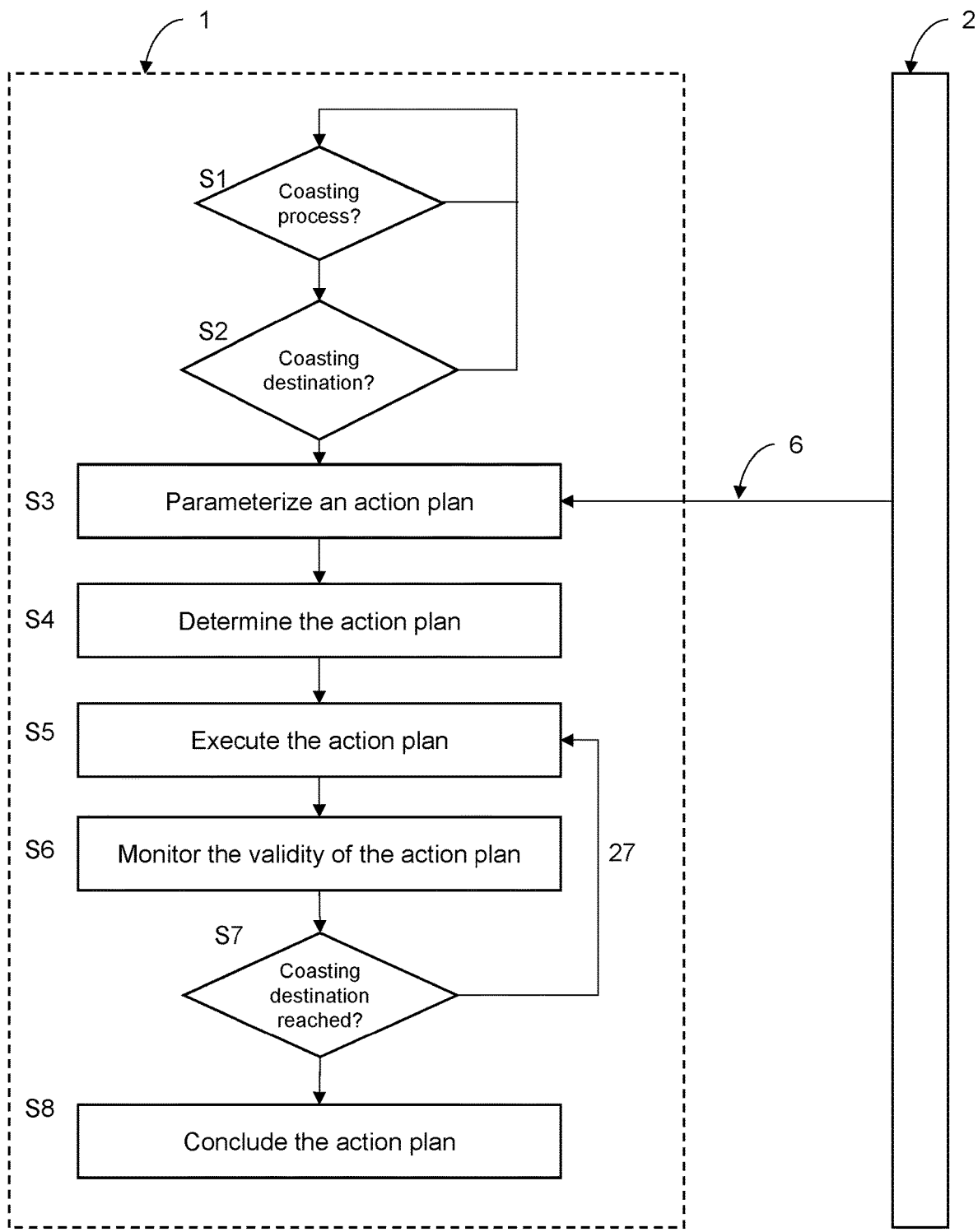
FIG. 1 shows an example operations chart according to embodiments of the present disclosure.

FIG. 1 shows an operations chart of a method according to the present disclosure for the operation of a driver assistance system, which is to assist the driver during coasting processes until a complete stop has been reached. The driver assistance system comprises here two generally independently realizable functions 1, 2, whereby function 2 relates to the issuance of an indication for the termination of an actuation of a gas pedal of the motor vehicle to a driver in relation to a coasting destination. Function 1 for the determination and execution of an action plan relates to the determination of a suitable operating strategy as soon as a coasting process actually begins. The two functions 1, 2 may obviously use the same algorithms and/or exchange data but in the present exemplary embodiment can be activated and deactivated by a user independently from each other. Functions 1, 2 are suitable for coasting destinations as well where a desired speed of the motor vehicle that is greater than 0 is to be achieved. In spite of that, however, the cases of a deceleration to a complete stop at a stopping position that are central for the present disclosure are discussed below, whereby reference is made to DE 10 2014 002 111 A1 for further explanations.

Function 2 of the issuance of an indication to a driver for the termination of the actuation of a gas pedal will not be addressed here in further detail either because it is generally known.

As far as function 1, in which an optimal operating strategy for the coasting process is to be determined, is concerned, it is checked in a first step S1 whether a coasting process is taking place at all; i.e., it is detected whether a termination of the gas pedal actuation has occurred. If this is the case, it is determined, independently from the issuance of an indication by function 2, whether a coasting destination exists in connection with which the coasting process can be performed. Here, specific, stationary coasting destinations at which the motor vehicle is to be brought to a complete stop, i.e., stopping positions, are to be predominantly discussed as far as this is made possible by the method according to the present disclosure.

Step S2 determines whether such a coasting destination exists. Various options are conceivable here. The first is the analysis of state information from a relevant infrastructure device, in particular a traffic light and/or a barrier, which may be received through vehicle-to-infrastructure communication. Furthermore, digital map information from a navigation system, in particular the position of stop signs and/or intersections along the currently traveled route, and/or traffic sign information determined by the image processing of data from an optical imaging device, in particular a camera, can be analyzed. Finally, information about a directly leading vehicle that describes a stopped vehicle can be determined from sensor data from at least one environment sensor, and/or communication data from vehicle-to-vehicle communication may be used to determine a stopping position. The most relevant cases are red traffic lights, stop signs, intersections, and stopped directly leading vehicles.

Step S3 relates to the parametrization of the determination of the action plan that follows in step S4 depending on whether an indication is issued by function 2 at the latest a specified time prior to the detection of the termination of the actuation of the gas pedal in step S1, as indicated by the arrow 6. The corresponding determination of the action plan is performed with a modification of what is described in DE 10 2014 002 111 A1, and which will be discussed below, so that, in summary, a sequence of measures relating to a switch in the operating state of the motor vehicle regarding the longitudinal guidance is selected from a measure group, whereby the measure group comprises an activation of an operation of the drive train of the motor vehicle in the free-run operating mode, an activation of an operation of the drive train in a coasting operating mode, an adaptation of a recuperation step, a change in the switching step of a transmission of the motor vehicle, and a brake intervention using a braking system of the motor vehicle. A maximum permitted braking deceleration, in this case of 3 m/s², is taken into consideration, whereby additionally a maximum permitted change of the braking deceleration may be provided to make an action plan that is as comfortable as possible. When a reaction follows the indication, higher values may be chosen for both limiting parameters.

When determining the action plan, an efficiency criterion relative to the energy balance of the motor vehicle and a target criterion relative to the deceleration to the coasting destination are taken into consideration to be able to achieve a complete stop at the stopping position in the most energy-efficient manner. An optimization process is used to determine the action plan. It is advantageous to generally classify some measures as less beneficial, in particular the performance of a brake intervention with the braking system. In addition to the ego data pertaining to the current operating state of the motor vehicle, route data containing a static description of the path to the stopping position and traffic situation data describing the current traffic situation, i.e., a dynamic description of temporary events along the path, is taken into consideration as well. The dynamic behavior of the motor vehicle, in particular the deceleration behavior, is mapped in a dynamic model of the motor vehicle, which is used as well.

Figure 2:
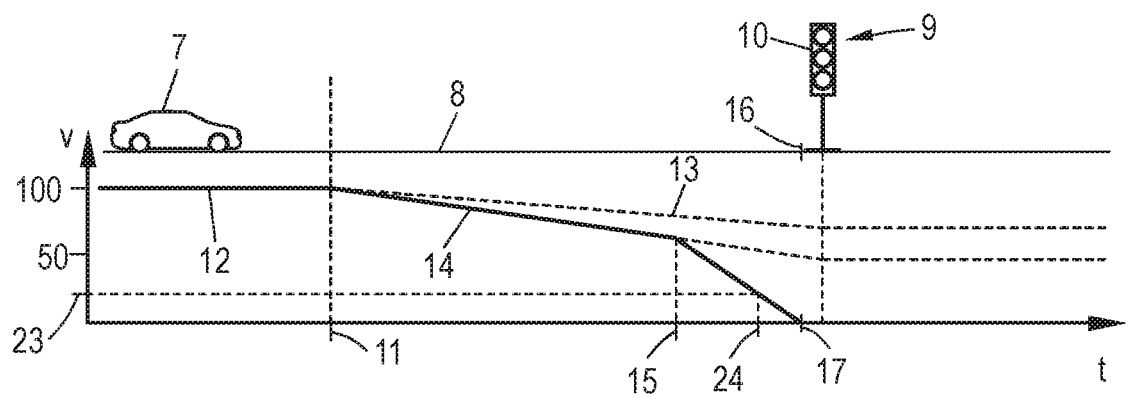
FIG. 2 shows an illustration of an example action plan with a respective velocity plot according to embodiments of the present disclosure.
Figure 3:
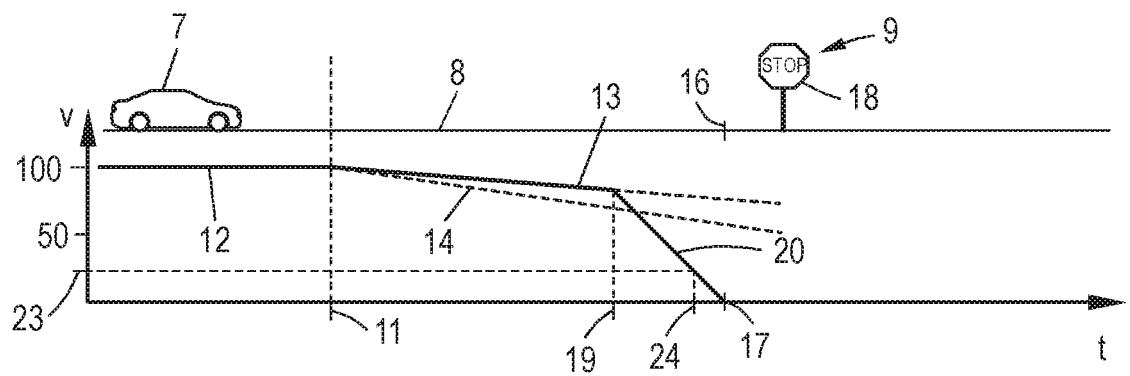
FIG. 3 shows an illustration of an example action plan with a respective velocity plot according to embodiments of the present disclosure.
Figure 4:
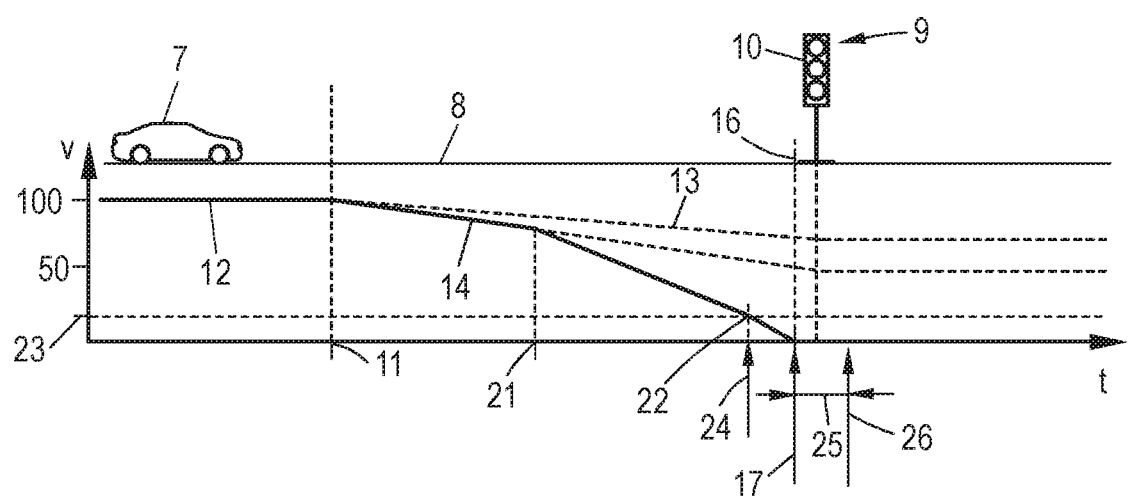
FIG. 4 shows an illustration of an example action plan with a respective velocity plot according to embodiments of the present disclosure.

Possible exemplary action plans are to be explained in further detail by FIG. 2-4.

FIG. 2 shows a case in which a motor vehicle 7 is to be decelerated along a route 8 to a coasting destination 9 in the form of a red traffic light 10. For the sake of simplicity, static and dynamic characteristics of the route are not shown here, but, as described, are certainly taken into consideration in Step S4.

A corresponding action plan, here for a motor vehicle 7 without electric motor, is shown in the form of a diagram of speed over time.

At a specific time 11, the driver takes the foot off the gas pedal and thus initiates the coasting process, whereby the movement was previously constant as indicated by the velocity plot 12. After, in this case, the free-run, indicated by the dotted course 13, leads to a slight deceleration and therefore another stronger brake intervention would be necessary, the first measure of the action plan is here that the drive train of the motor vehicle 7 is put in a coasting operating mode for as long as possible (refer to course 14), which is maintained up to a specific time 15. Then a braking system of the motor vehicle 7 is actuated for a brake intervention so that the maximum allowed brake deceleration is not exceeded, to bring the motor vehicle to a stop at the stopping position 16 at the specific time 17 shortly in front of the traffic light.

FIG. 3 shows another possible action plan. To make the explanation easier, the corresponding specific times/courses have the same reference signs. In contrast with FIG. 2, a stop sign 18 is used here as the coasting destination 9, the existence and position of which the motor vehicle 7 may know of from a traffic sign recognition from image data of a camera and/or from the digital map information of a navigation system of the motor vehicle 7.

In this case, the motor vehicle 7 has an electric motor so that a recuperation operating mode is possible. It was found that it is an energy-efficient option to first switch the drive train of the motor vehicle 7 to a free-run operating mode at a specific time 11 (cf. course 13), to then switch it to the coasting operating mode of the drive train as a further measure of the action plan at a specific time 19, whereby the recuperation step is adapted so that the course 20 with a complete stop at the stopping position 16 results at the specific time 17.

FIG. 4 shows another example of an action plan for the deceleration of the motor vehicle 7 to a total stop at a stopping position 16, whereby the coasting destination 9 is formed in this case again by a red traffic light 10. It is determined there in the optimization method as well that using the free-run operating mode (course 13) is not practicable either, so that a switch is made at the specific time 11 to the coasting operating mode, still without recuperation (cf. course 14). At a specific time 21, a switch is made to a recuperation operating mode as another measure to gently increase the brake deceleration, where the braking system here applies slightly more brake force at a specific time 22.

In any of the cases of FIG. 2, it is important and planned to suppress the actually scheduled activation of a crawl control when the speed of the motor vehicle 7 falls short of a threshold value 23 (cf. specific time 24).

Compared to a coasting destination in which the desired speed of the motor vehicle 7 is greater than 0 km/h, the action plan is further expanded by another measure, which is only indirectly shown in FIG. 4, but which is certainly provided for the examples of FIGS. 2 and 3 as well. The motor vehicle is kept at a complete stop at the specific time 17 for a time span 25 (cf. FIG. 4), which may be 2 seconds, for example. To keep the motor vehicle 7 at a complete stop, a hydraulic, gentle actuation of the operating brake of the braking system is provided here. At the same time, a takeover indication is provided at the specific time 17, primarily optically in a display as an indicator device in the instrument panel of the motor vehicle 7, for example in the form of "take over brake pedal" or the like. If the driver does not take over the braking within the time span 25, which ends at a specific time 26, an acoustic warning, for example a warning sound, is emitted, and additionally the crawl control, whose activation was suppressed on until now, is activated again so that the motor vehicle would start moving forward again. This way, the driver is intuitively caused to actuate the brake pedal when the complete stop has been achieved. If the driver has already taken over the brake pedal during the time span 25, no warning is issued; the crawl control is, however, reactivated regardless.

It should be pointed out that, as can be seen at all specific measure times 11 15, 19, 21, and 22, the operating state of the motor vehicle 7 changes regarding the longitudinal guidance.

Returning to FIG. 1, the execution of the action plan begins with step S5, whereby, however, the further validity of step S6 is always monitored depending on the current traffic situation data and the current speed of the motor vehicle 7. If an unexpected effect occurs, for example an overly strong deceleration of the motor vehicle due to an incline, which was not exactly reflected in the route data, the action plan may be altered accordingly by dynamic adaptation so that a complete stop is still achieved as closely to the stopping position 16 as possible. Another example for the potentially necessary adaptation of the action plan is when the traffic situation data describes that the motor vehicle is about to hit a slower traffic participant, whereby it then may become necessary to first adapt the speed of the motor vehicle to the leading, slower traffic participant.

If it becomes impossible in the context of the coasting process and the specified limits of its calculation to reach a complete stop at the stopping position 16 or within a tolerance range around the same so that, to maintain the overall safety, an intervention by the driver itself is necessary, the driver is informed accordingly by issuing the corresponding notification, here a driver takeover request, which is not shown in FIG. 1 for the sake of clarity.

Step S7 verifies that the coasting destination 9 has been reached. If not, the execution of the potentially not updated action plan is continued in step S5 (cf. arrow 27).

Otherwise, the action plan is concluded in step S8, as described by keeping the vehicle stationary for the time span 25, whereby the takeover notification is issued at the same time, and after the end of the time span 25, the crawl control is reactivated and, if necessary and if the driver did not take over the braking, the warning is issued.

Then the process is continued in step S1 again to wait for the next coasting process.

It should be noted here, however, that the sequence of steps S1 and S2 may be interchanged as needed.

During the execution of an action plan, this can be communicated to the driver by a corresponding status display, whereby in the present exemplary embodiment different status displays are used, depending on whether a notification is responded to or not within the specified time. In the second case, exemplary embodiments in which no status display is provided are conceivable as well. The status display may be realized as an expansion of the symbol that is used for the issuance of the indication.

Figure 5:
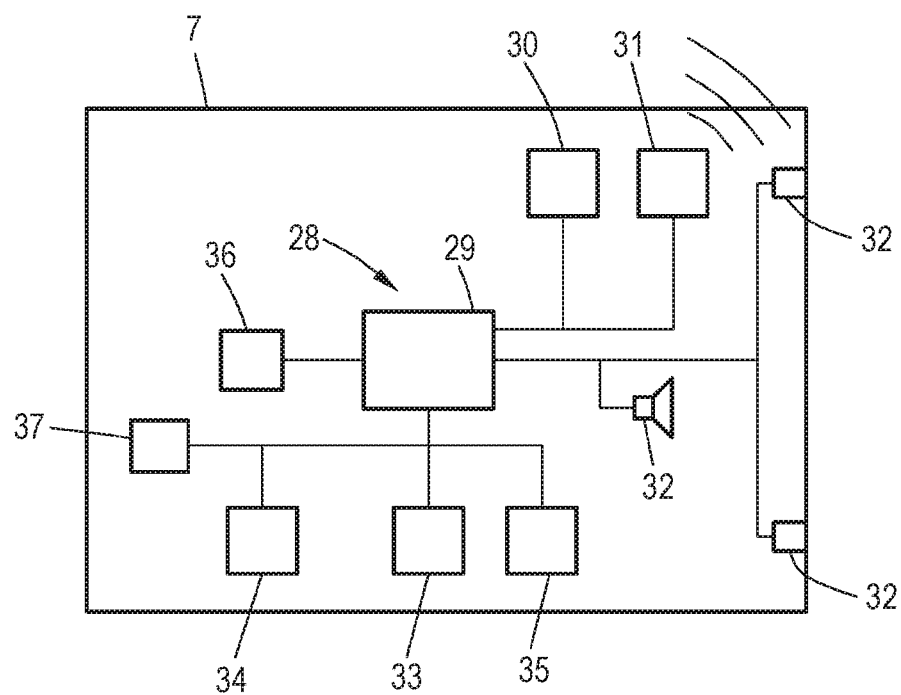
FIG. 5 shows an example motor vehicle according to embodiments of the present disclosure.

FIG. 5 finally shows a schematic diagram of the motor vehicle 7 according to the present disclosure. It comprises the driver assistance system 28 for assisting the driver during a coasting process, which can realize the functions 1 and 2 by means of a control device 29 formed to execute the method according to the present disclosure. To obtain the data necessary, the control device 29 is connected with other vehicle systems by means of a bus system, for example a CAN bus or a FlexRay bus, which are shown here only partially. The motor vehicle 7 furthermore has a navigation system 30 with digital map data, a vehicle-to-X communication device 31, and environment sensors 32, comprising a camera.

With the control device 29, the operating states of the motor vehicle 7 that relate to the longitudinal guidance 7 can be established, in particular through other control devices not described in further detail here. Via the vehicle bus, there is therefore a connection to the transmission 33, the drive motor 34, the clutch 35, and the braking system 26. The clutch 25, the transmission 33 and the drive motor 34 are parts of the drive train of the motor vehicle 7, which the crawl control 37 is considered part of as well.

The invention claimed is:

1. A method for operating a driver assistance system which provides assistance to a driver during a coasting process in a motor vehicle whose drive train can be operated in a free-run operating mode in which a drive motor is disconnected from the drive train by a clutch, the method comprising:
   determining a coasting destination of the motor vehicle, the coasting destination requiring a deceleration of the motor vehicle;
   determining, when the driver assistance system is activated, an action plan comprising at least one measure for a targeted deceleration of the motor vehicle, the action plan determined based at least in part on at least one effectiveness criterion relating to an energy balance of the motor vehicle, and at least one destination criterion relating to the targeted deceleration with respect to the coasting destination;
   determining predictive route data describing a distance to the coasting destination when the driver ends an activation of a gas pedal; and
   after the motor vehicle has come to a complete stop at a stopping position, actively holding the motor vehicle in place by a holding action for at least a predetermined time span;
   wherein the at least one measure is used for a longitudinal guidance of the motor vehicle, wherein the at least one measure is selected from a measure group of at least one operation in a free-run operating mode and at least one operation in a coasting operating mode, wherein the coasting destination comprises the stopping position, and wherein the action plan specifies the targeted deceleration of the motor vehicle so that the motor vehicle comes to the complete stop at the stopping position.

2. The method according to claim 1, further comprising:
   receiving, by a vehicle-to-infrastructure communication, at least one of status information or digital map information, the status information received from at least one of a traffic light or a barrier, the digital map information received from a navigation system; and
   wherein the coasting destination is determined based at least in part on at least one of:
   positions of one or more stop signs or one or more intersections along a currently traveled route,
   traffic sign information determined by processing data from a camera device, or
   information describing a directly leading vehicle determined based at least in part on sensor data of at least one environment sensor, or communication data from a vehicle-to-vehicle communication;
   wherein at least one of the positions of the one or more stop signs or the one or more intersections, the traffic sign information, or the information describing the directly leading vehicle is determined based at least in part on the status information or digital map information.

3. The method according to claim 1, further comprising suppressing an activation of a crawl control of the drive train during an execution of the action plan when a current speed of the motor vehicle falls short of a threshold value.

4. The method according to claim 1, further comprising activating a braking system of the motor vehicle, and wherein actively holding the motor vehicle in place by the holding action comprises performing a hydraulic or electromotive holding of an operating brake of the braking system.

5. The method according to claim 1, further comprising, as the motor vehicle reaches the complete stop, providing an optical takeover indication to the driver relating to the holding action.

6. The method according to claim 5, further comprising providing a warning to the driver when the driver does not take control of the motor vehicle during the predetermined time span.

7. The method according to claim 1, further comprising activating a crawl control after an end of the predetermined time span when the complete stop is not manually maintained by the driver.

8. The method according to claim 1, wherein the predetermined time span is between one second and three seconds.

9. The method according to claim 1, further comprising limiting a maximum allowed brake deceleration during performance of the action plan.

10. The method according to claim 1, wherein the measure group further comprises at least one of an adaptation of a recuperation step, a change in a switching step of a transmission of the motor vehicle, or a brake intervention using a braking system of the motor vehicle.

11. The method according to claim 1, wherein the at least one measure is associated with a switch of operating mode of the motor vehicle relating to the longitudinal guidance.

12. The method according to claim 1, wherein determining the action plan comprises determining the action plan based at least in part on traffic situation data describing a current traffic situation.

13. The according to claim 12, wherein the traffic situation data comprises data associated with at least one traffic participant other than the driver, current weather conditions, or current road conditions, and wherein the traffic situation data is determined based at least in part on one or more environment sensors of the motor vehicle or vehicle-to-vehicle communication data.

14. A motor vehicle comprising a drive train operable in a free-run operating mode, the motor vehicle having a driver assistance system configured to assist a driver during a coasting process, the driver assistance system implemented using a controller configured to:
 determine a coasting destination of the motor vehicle, the coasting destination requiring a deceleration of the motor vehicle;
 determine, when the driver assistance system is activated, an action plan comprising at least one measure for a targeted deceleration of the motor vehicle, the action plan determined based at least in part on at least one effectiveness criterion relating to an energy balance of the motor vehicle, and at least one destination criterion relating to the targeted deceleration with respect to the coasting destination;
 determine predictive route data describing a distance to the coasting destination when the driver ends an activation of a gas pedal; and
 after the motor vehicle has come to a complete stop at a stopping position, actively hold the motor vehicle in place by a holding action for at least a predetermined time span;
 wherein the at least one measure is used for a longitudinal guidance of the motor vehicle, wherein the at least one measure is selected from a measure group of at least one operation in a free-run operating mode and at least one operation in a coasting operating mode, wherein the coasting destination comprises the stopping position, and wherein the action plan specifies the targeted deceleration of the motor vehicle so that the motor vehicle comes to the complete stop at the stopping position.

* * * * *